Sept. 27, 1966  J. E. WHITFIELD  3,275,226
THRUST BALANCING AND ENTRAPMENT CONTROL MEANS FOR
SCREW TYPE COMPRESSORS AND SIMILAR DEVICES
Filed Feb. 23, 1965  6 Sheets-Sheet 1
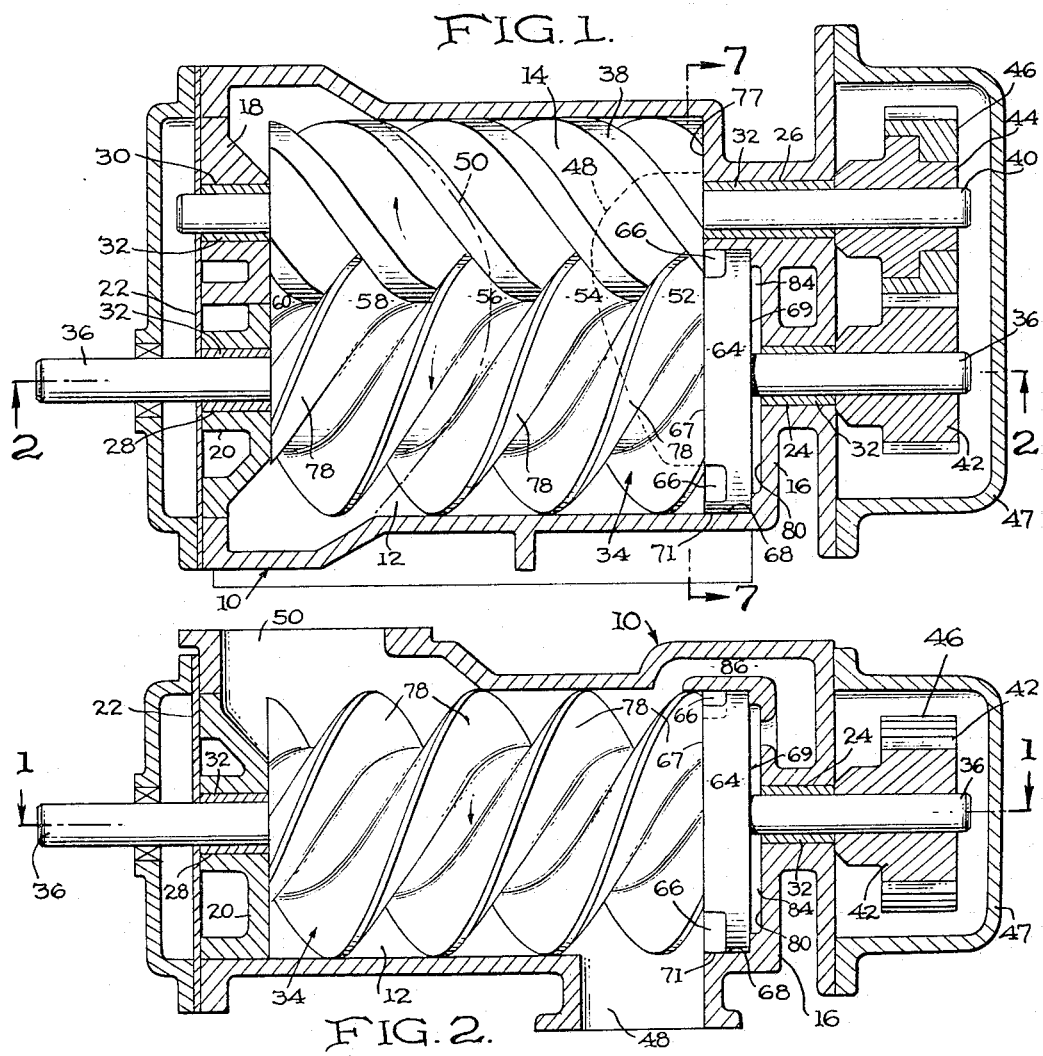
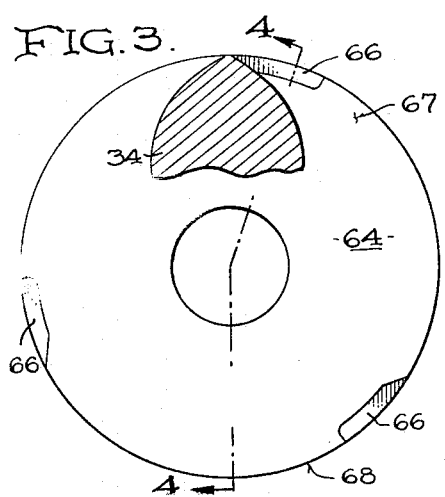
INVENTOR
JOSEPH E. WHITFIELD
BY Cameron, Kerkam & Sutton
ATTORNEYS

INVENTOR
JOSEPH E. WHITFIELD

BY Cameron, Kerkam & Sutton
ATTORNEYS

Sept. 27, 1966 J. E. WHITFIELD 3,275,226
THRUST BALANCING AND ENTRAPMENT CONTROL MEANS FOR
SCREW TYPE COMPRESSORS AND SIMILAR DEVICES
Filed Feb. 23, 1965 6 Sheets-Sheet 3
FIG. 9.
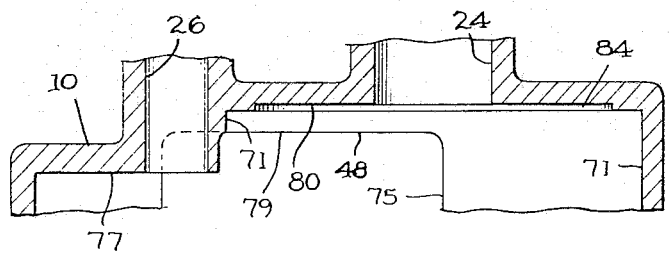
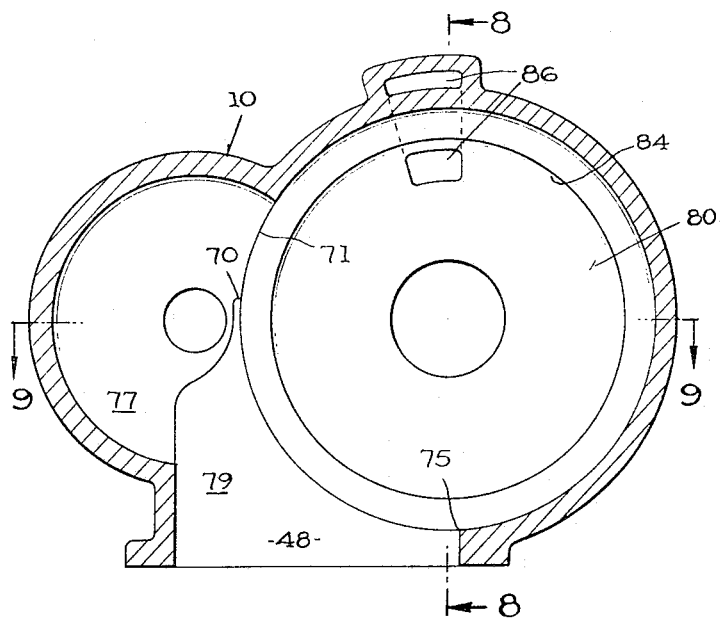
FIG. 7.
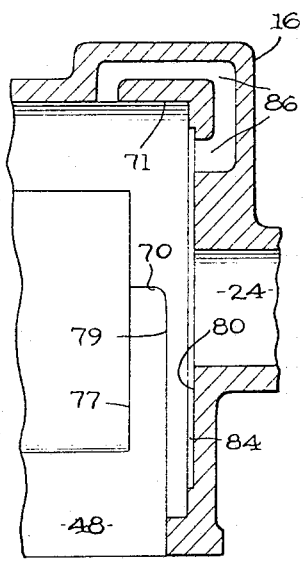
FIG. 8.
INVENTOR
JOSEPH E. WHITFIELD
BY
Cameron, Kerkam & Sutton
ATTORNEYS INVENTOR
JOSEPH E. WHITFIELD
BY Cameron, Kerkam & Sutton
ATTORNEYS

INVENTOR
JOSEPH E. WHITFIELD

BY
Cameron, Kerkam & Sutton
ATTORNEYS

INVENTOR
JOSEPH E. WHITFIELD
BY
Cameron, Kerkam & Sutton
ATTORNEYS

United States Patent Office 3,275,226
Patented Sept. 27, 1966

3,275,226
THRUST BALANCING AND ENTRAPMENT CONTROL MEANS FOR SCREW TYPE COMPRESSORS AND SIMILAR DEVICES
Joseph E. Whitfield, P.O. Box 325, York, Pa.
Filed Feb. 23, 1965, Ser. No. 434,294
11 Claims. (Cl. 230—143)

This invention relates generally to fluid pumps, motors, compressors, blowers and similar devices in which rotary members are provided with intermeshing helical threads, and more particularly to novel thrust balancing and entrapment control means for such devices.

Screw type devices of this general nature have two or more helically threaded members rotatably supported with their axes substantially parallel and with their threads intermeshing to form a working seal between the rotors. A housing encloses the rotary members, and the chambers of the housing form a working seal with the perimetric tips of the rotor threads.

To form satisfactory seals and pockets and to permit rotation of the members, the threads must be complementary. Thus, the rotors are dissimilar in cross section, one rotor being provided with a right-hand thread while the other rotor is provided with a left-hand thread. The threads of one rotor lie wholly, or almost wholly, outside its pitch circle and absorb almost all of the input power. This rotor is termed the main or male rotor. The threads on the mating rotor lie wholly, or almost wholly, within its pitch circle and form a gate across the path of the main rotor threads. This rotor is termed the gate or female rotor. In the following description of the invention, the terms "main" and "gate" rotors will be used exclusively, because they are more accurately descriptive of the members to which they are applied.

In the present invention, the main and gate rotors are of the fully generated type as shown in my U.S. Patents Nos. 2,287,716 and 2,486,770. Rotors of this type, as they revolve, continuously form fluid pockets at the suction end, the fluid being separated into individual slugs, and carry the fluid axially along the rotors to the discharge end where the pockets run out and the fluid is discharged through a discharge port. As the rotors are rotated, the threads on the main rotor, in effect, act as a continuous series of pistons which progress endwise through the troughs formed by the gate rotor threads.

When the rotors are in operation, the pockets formed by the rotor threads develop from zero size to a definite, fixed, maximum size and simultaneously are filled with fluid from the suction or intake port. After reaching maximum size and being filled with fluid, they are sealed by the coaction of the threads with one another and with the walls of the rotor chambers in the housing. The fluid is thus trapped in the pockets and is delivered to the discharge port by the rotation of the rotors. Since the capacity of the device is determined by the size of the pockets formed by the rotors and the speed of rotation thereof, it may be termed a fixed capacity or positive displacement device.

Upon continued rotation of the rotors, the main part of the compressed fluid is discharged through the discharge port, but a small volume is entrapped in a sealed pocket formed by the rotors. Without some means of venting the fluid entrapped in the sealed pocket, the device cannot pump liquids, and is useful for elastic fluids only at relatively low speeds.

One known method of avoiding the formation of sealed pockets is by tapering the rotor ends in the manner shown in my U.S. Patent No. 2,922,377. Despite the advantages of eliminating the sealed pockets by utilizing such tapered rotors, the difficulty inherent in machining tapered rotors makes the overall product expensive and limits such a device to applications where the high cost is commercially justified. Accordingly, where the need for a more economical design exists, resort is made to venting arrangements for removing the entrapped fluids at the discharge end. One such arrangement is shown in my U.S. Patent No. 2,287,716 wherein a venting slot is provided in the ends of the threads of the main rotor. Although this slot reduces the noise considerably and is useful at low pressures, the design is not satisfactory under all conditions.

Another arrangement for venting entrapped volumes of compressed fluid is disclosed in Montelius Patent No. 2,578,196 wherein the discharge port is arranged in the side of the compressor casing and the end of one of the cooperating rotors is closed by a valve plate fixed on this rotor and having a necessary clearance with the end wall of the casing. In this construction, openings in the valve plate provide passages from each rotor trough to a channel in the end wall which is connected to the discharge port, but is covered by the valve plate. While such an arrangement drains the entrapped volume to the discharge port while avoiding the formation of a direct passage from the high pressure side to the low pressure side, it is subject to several disadvantages.

One disadvantage is that a certain volume of fluid is confined in the passages in the valve disc which expands to the suction side and is a loss. If the passages are made large enough to fully vent the sealed pockets in the time available at high speed, then the volume loss cancels out much of what is gained by providing the vents. Thus, a valve plate venting arrangement having passages that extend entirely through the valve plate is, at best, a compromise between the requirements of making the passages large enough to fully vent the sealed pockets, and making the passages small enough the effect minimum confinement of fluid in the passages.

Another disadvantage of such an arrangement wherein the venting passages extend axially through the valve plate is that high pressure fluid collects in the clearance between the valve plate and the housing end wall creating an unbalanced thrust problem. Also, the presence of high pressure on the outside of the valve plate necessitates specially designed high pressure seals for use on the exterior flat surface of the valve.

In accordance with the present invention, these and other disadvantages of prior art structures are overcome, and there is provided a screw-type compressor or similar device having fully generated main and gate rotors which are driven so as to continuously form pockets to carry fluid axially along the rotors from the suction port to the discharge port, where the pockets run out and the fluid is discharged. A control disc is disposed on one end of either the main rotor or the gate rotor, and is provided with spaced venting ports which extend from the inner plane surface to the peripheral surface of the disc and provide direct communication between the discharge port and the sealed pockets formed by the rotors after the normal discharge of the fluid through the discharge port so as to permit the entrapped fluid to be vented directly to the discharge port. Even more importantly, the control disc is so designed as to eliminate unbalanced thrust on the rotor bearings.

Accordingly, it is a primary object of the present invention to provide a device of the character described which eliminates thrust on the rotor bearings, particularly in the case of the main rotor, and also eliminates entrapment of compressed fluid at the discharge end of the rotors.

Another object is to provide a rotary screw type compressor wherein entrapment is eliminated without reducing capacity or creating a direct leakage path, a better seal is provided at the discharge end of the device, and the length of sealing lines is reduced.

A further object of the invention is to provide a device of the type specified which minimizes volume loss due to entrapment of fluid at the discharge end, and also eliminates leakage between the discharge ends of the rotor threads and the housing end wall.

Still another object is to provide a screw compressor or similar device embodying easily machinable rotors wherein the fluid pockets are readily vented through a simple discharge port controlled by a novel form of venting disc, and the thrust on the rotors is balanced.

A still further object of the invention is to provide a device of the character described which eliminates at least one high pressure shaft seal, and includes an adjustable, self-fitting seal for the discharge end of the main rotor which is not subject to continuous wear.

Other objects and advantages of the present invention will appear from the following detailed description of the mechanical embodiments thereof which are illustrated in the accompanying drawings. However, it is to be expressly understood that these drawings are for the purpose of illustration only, and are not intended to represent the full scope of the invention which is defined by the appended claims.

In the drawings, wherein like reference characters indicate like parts throughout the several views:

FIG. 1 is a vertical sectional view, with certain parts shown in full, taken along line 1—1 in FIG. 2, of one form of screw type compressor embodying the present invention;

FIG. 2 is a horizontal sectional view, with certain parts shown in full, taken through the axis of the main rotor on line 2—2 in FIG. 1;

FIG. 3 is a front elevational view of the control disc of FIGS. 1 and 2, including a fragmentary section of one of the threads of the main rotor;

FIG. 4 is a vertical section of the control disc of FIG. 3 taken along line 4—4 in FIG. 3;

FIG. 7 is a transverse sectional view taken along line 7—7 in FIG. 1 with the rotors and control disc removed;

Figure 10:
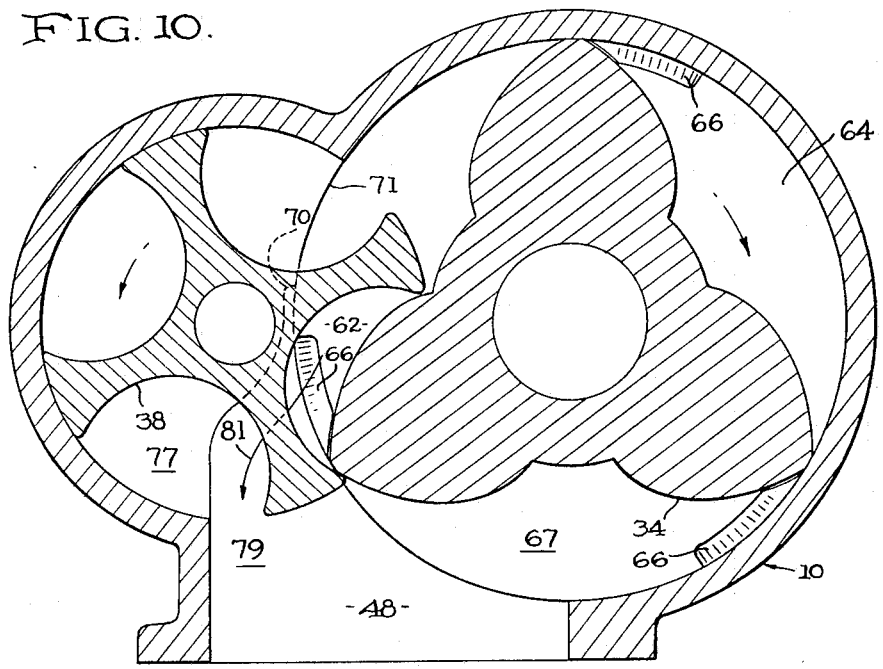
Figure 11:
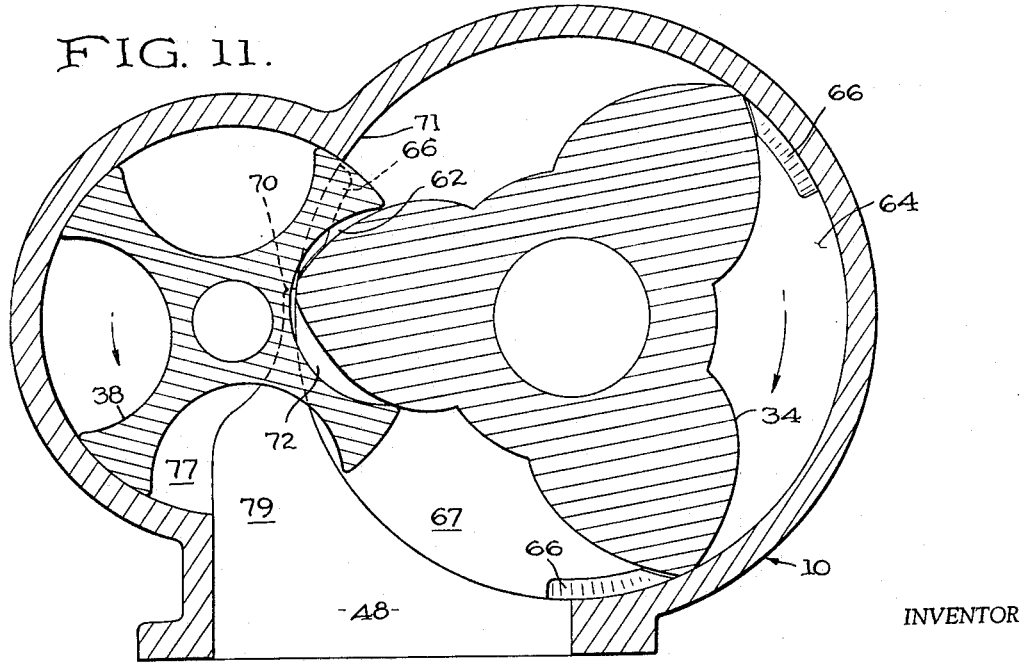
Figure 12:
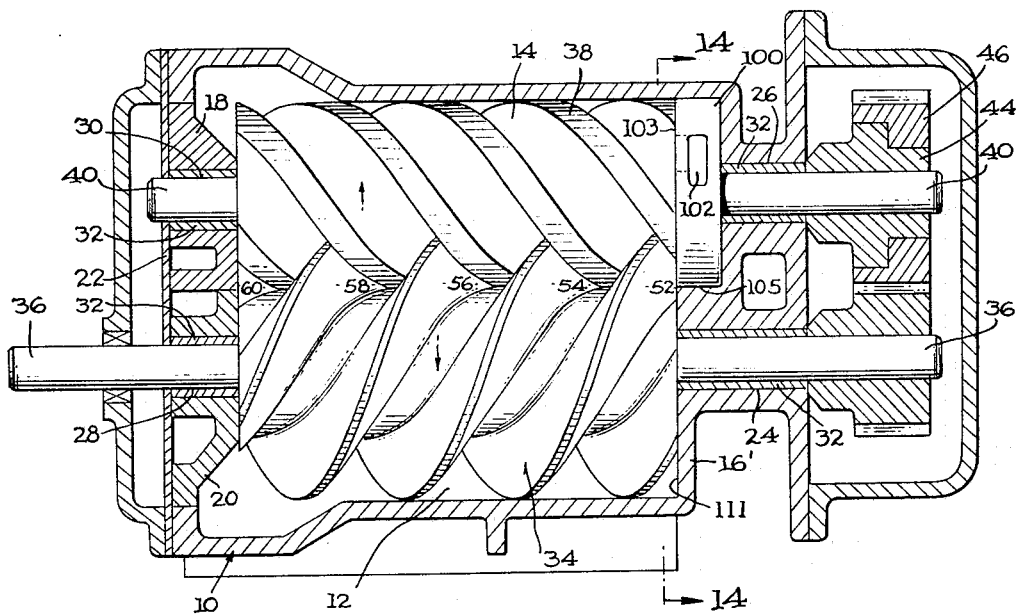
Figure 13:
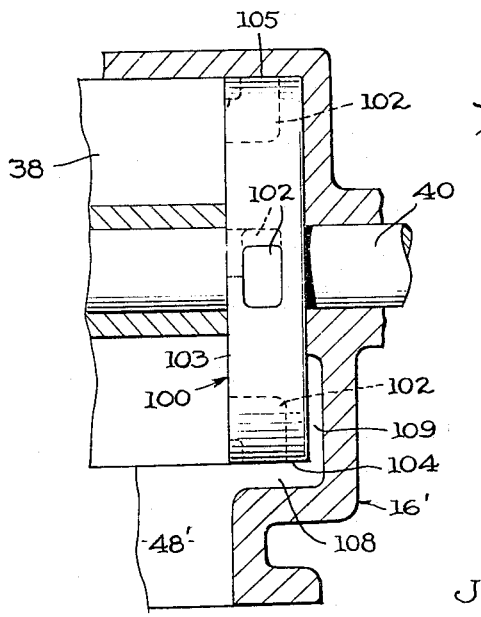
Figure 14:
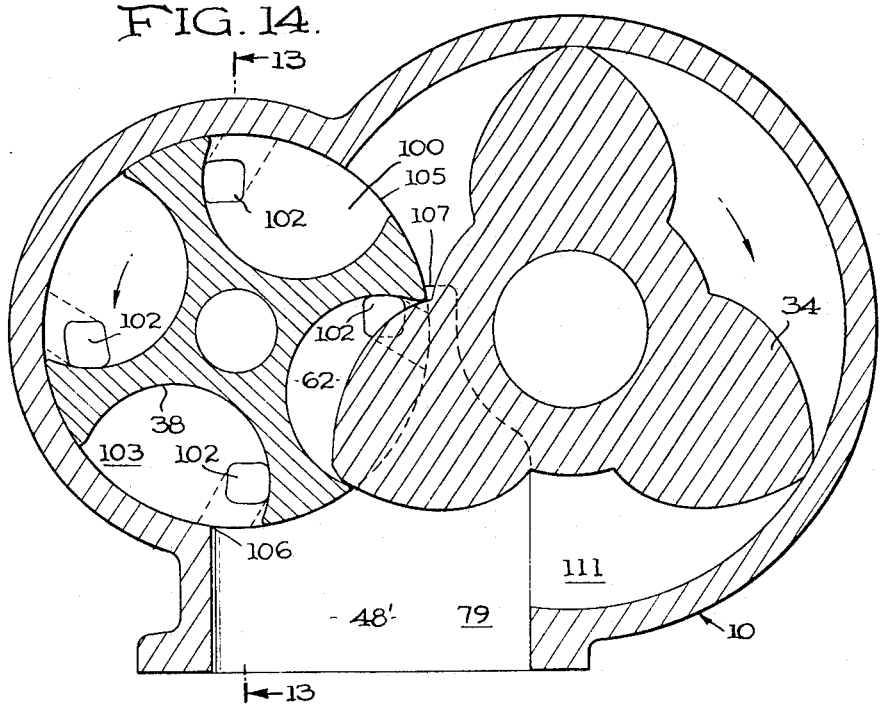

FIGS. 8 and 9 are sectional views taken along lines 8—8 and 9—9, respectively, in FIG. 7;

FIG. 10 is a sectional view taken along line 7—7 in FIG. 1 showing a main rotor thread sealing with a gate rotor trough;

FIG. 11 is a view similar to FIG. 10, but showing the gate and main rotors progressed to form a suction space interposed between a pocket formed by the rotors and the discharge port;

FIG. 12 is a view similar to FIG. 1 showing a modified form of the invention having a venting disc arranged on the gate rotor;

FIG. 13 is a fragmentary sectional view taken along line 13—13 in FIG. 14;

FIG. 14 is a transverse sectional view taken along line 14—14 in FIG. 12; and

Figure 15:
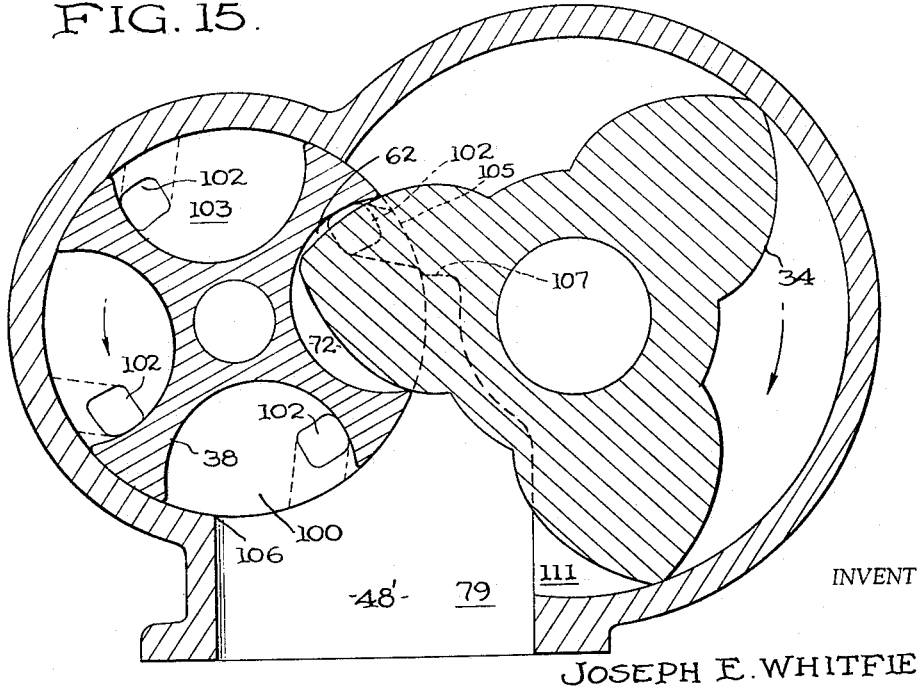

FIG. 15 is a view similar to FIG. 14, but showing the rotors advanced to a position comparable to that illustrated in FIG. 11.

Referring now to FIGS. 1 and 2 wherein the invention is shown, by way of example, as applied to a screw type pump or compressor, the housing 10 of the device contains two part-cylindrical chambers 12 and 14 disposed side by side in parallelism and merging into each other to form a common rotor chamber, the cross section of which is generally of figure 8 form. One end of the housing 10 (the discharge end in the embodiment illustrated in FIGS. 1 and 2) is provided with an integral end wall 16 having spaced inner and outer portions, the inner portion of which forms one end wall of the chambers 12 and 14. The other end of the housing is closed by a removable end wall formed in two sections 18 and 20, which enables insertion of a pair of mating helical rotors 34 and 38 arranged to operate within the rotor chambers 12 and 14, respectively. Rotor 34 is termed the main rotor and has left-hand threads in the device shown, while rotor 38 is termed the gate rotor and has threads that are complementary to those of the main rotor, i.e., right-hand threads. As mentioned above, the rotors are of the fully generated type and develop sealed pockets at the discharge ends thereof.

The removable end wall at the suction end of the housing is made in two parts 18 and 20 in the form of reentrant heads which are self-centering in the rotor chambers 14 and 12, respectively. The reentrant head 18 for the gate rotor chamber 14 is continuously circular on its periphery, and fits into the chamber without clearance. The reentrant head 20 for the main rotor chamber 12 also has a circular periphery except for a concave niche formed in one side which allows it to be assembled in the housing beside the gate rotor reentrant head 18. The reentrant heads 18 and 20 are held in proper relation to the housing by the head-plate 22.

The end wall 16 at the discharge end of the housing is provided with two cylindrical bearing bores 24 and 26 which are concentric with the main rotor chamber 12 and the gate rotor chamber 14, respectively. Likewise, the reentrant heads 18 and 20 are provided with cylindrical bearing bores 30 and 28, respectively, which are centrally located in their respective reentrant heads. Each of the cylindrical bearing bores 24, 26, 28 and 30 is provided with a bearing bushing 32.

The main rotor 34 is fixedly attached to a driving shaft 36 and is centrally located in the main rotor chamber 12 by the bushings 32 and bearing bores 24 and 28. The gate rotor 38 is likewise secured to a shaft 40 and centrally located in the gate rotor chamber 14 by the bushings 32 and bearing bores 26 and 30. The main rotor shaft 36 has a timing gear 42 fixedly attached thereto, while the gate rotor shaft 40 has a hub 44 fixed thereto on which is adjustably mounted a gear 46 meshing with timing gear 42. This provision for adjustment allows the rotor threads to be accurately timed in relation to one another. Gears 42 and 46 are housed in a suitable casing 47 which may be spaced from end wall 16 by supporting ribs 49, as more clearly shown in FIG. 5.

A lateral discharge port 48 is provided in the gear end of the housing, and a lateral suction port 50 is provided in the drive end of the housing, diagonally opposite port 48. As viewed in FIG. 1, with the rotors rotating as indicated by the arrows, the discharge port 48 would be at the rear side of the gear end of the housing, as indicated in broken lines, while the suction port 50 would be diagonally opposite at the front side of the drive end, as indicated in phantom lines. The rotor chambers 12 and 14 and the reentrant heads 18 and 20 are slightly larger in diameter than the rotors 34 and 38 so that the rotor threads have a minimum running clearance with respect to the chamber walls.

Screw type rotors of the character used in practicing the invention have a fixed displacement, depending on size and design, and deliver a constant measured amount of fluid per revolution. The spaces between the threads on the gate rotor 38 and the spaces between the threads on the main rotor 34 combine or merge, in pairs, to form common sealed spaces which are termed pockets. For example, as indicated in FIG. 1, the pockets 52, 54, 56, 58 and 60 are formed as the spaces between the threads on the two rotors merge together. Each pocket is sealed from the other and is developed at the suction end of the compressor where it fills with fluid. Upon continued rotation of the rotors, each developed pocket progresses toward the discharge port, and as it progresses, the pocket becomes smaller, thus compressing the fluid, until the leading edge of the pocket passes the cut-off edge of the discharge port, whereupon the fluid is discharged from the pocket.

As shown in FIG. 10, as the main rotor 34 and the gate rotor 38 roll into full mesh at the discharge end of the casing, a sealed pocket 62 is formed. Without some means of venting the pocket 62, the device is incapable of pumping liquids and can pump elastic fluids only at relatively low speeds. In order to overcome this disadvantage of conventional screw type pumps and compressors, the present invention provides novel means for venting the fluid entrapped in the sealed pocket comprising a ported disc of unique construction which may be fixedly attached to either the main rotor 34 or the gate rotor 38. In the preferred embodiment, a venting disc 64 is mounted on the main rotor, as shown in FIGS. 1–11.

Referring now to FIGS. 1–4, 10 and 11, disc 64 is provided with a plurality of specially shaped vents 66, equal in number to the threads of main rotor 34, which are formed as recesses in the inner face 67 of the disc extending inwardly from peripheral surface 68 thereof. Vents 66 extend only partially into the thickness of disc 64, so that opening and closing thereof is controlled by the rotation of peripheral surface 68 of the disc relative to the surrounding surface 71 of end wall 16 which is narrower than surface 68 throughout that portion of its circumference paralleling the arcuate side of discharge port 48, i.e., between the cut-off edge 70 and the side edge 75 (FIGS. 7 and 9).

During rotation of the rotors, as the pocket 62 is sealed (FIG. 10), the vent 66 maintains the pocket in direct communication with the discharge port 48 so that the entrapped fluid can escape. The vent passage remains open to the discharge port until the sealed pocket 62 "runs out" at the cut-off edge 70 of the port (FIG. 11), after which the vent is closed by the wider portion of surface 71. Upon continued rotation of the rotors, the extreme end of the suction pocket indicated at 72 interposes itself between the pocket 62 and the discharge port 48, but back-flow of high pressure air into the suction pocket is prevented by the solid portion of disc 64.

As will be seen best from FIGS. 8 and 9, the surface 77 of end wall 16 is higher (as viewed in FIGS. 7, 10 and 11) than the surface 79, and the end of the gate rotor 38 runs closely to surface 77 and forms a seal therewith to avoid leakage. Since the surface 79 is lower than surface 77, there is no seal between surface 79 and the discharge ends of the gate rotor threads. Consequently, the fluid in the sealed pocket 62 of FIG. 10 is free to flow past the end of the gate rotor thread into the discharge port 48, as indicated by the arrow 81. At the same time, since the inner surface 67 of the disc 64 is at the same height as the surface 77 of the end wall, the end of the gate rotor makes a seal with both of surfaces 67 and 77. As will be seen from FIG. 11, this provides a seal against leakage from the discharge port 48 back into the suction pocket 72.

The circumferential length of vents 66 is dependent on the position of the cut-off edge 70 of the discharge port 48, since the forward or leading end of the vent passage 66 must not clear the gate rotor 38 before the trailing end of said passage seals at the cut-off edge 70. Otherwise, there will be a leakage opening from the high pressure side to the low pressure side of the device. As shown in FIGS. 10 and 11, which are substantially scale drawings of an operative embodiment of the invention, the trailing edge of each vent 66 is coincident with the leading edge of a main rotor thread at the discharge end thereof and extends forwardly through an arcuate distance of approximately 28° as measured on the peripheral surface 68 of disc 64.

Under certain conditions, as for low speed operation, the vents 66 may be made very shallow, or even completely eliminated, and still leave passages for the escape of fluid from the sealed pockets along paths such as that indicated by the arrow 81 in FIG. 10.

In screw compressors of the character embodying the invention, substantially all of the thrust is on the main rotor 34, with very little being exerted on the gate rotor 38, and when operating at high speeds and pressures, the thrust is difficult to control. However, as will be seen best from FIGS. 2, 5 and 7–9, the disc 64 not only vents the sealed pockets, but also effectively eliminates unbalanced thrust on the main rotor and its bearings.

Figure 5:
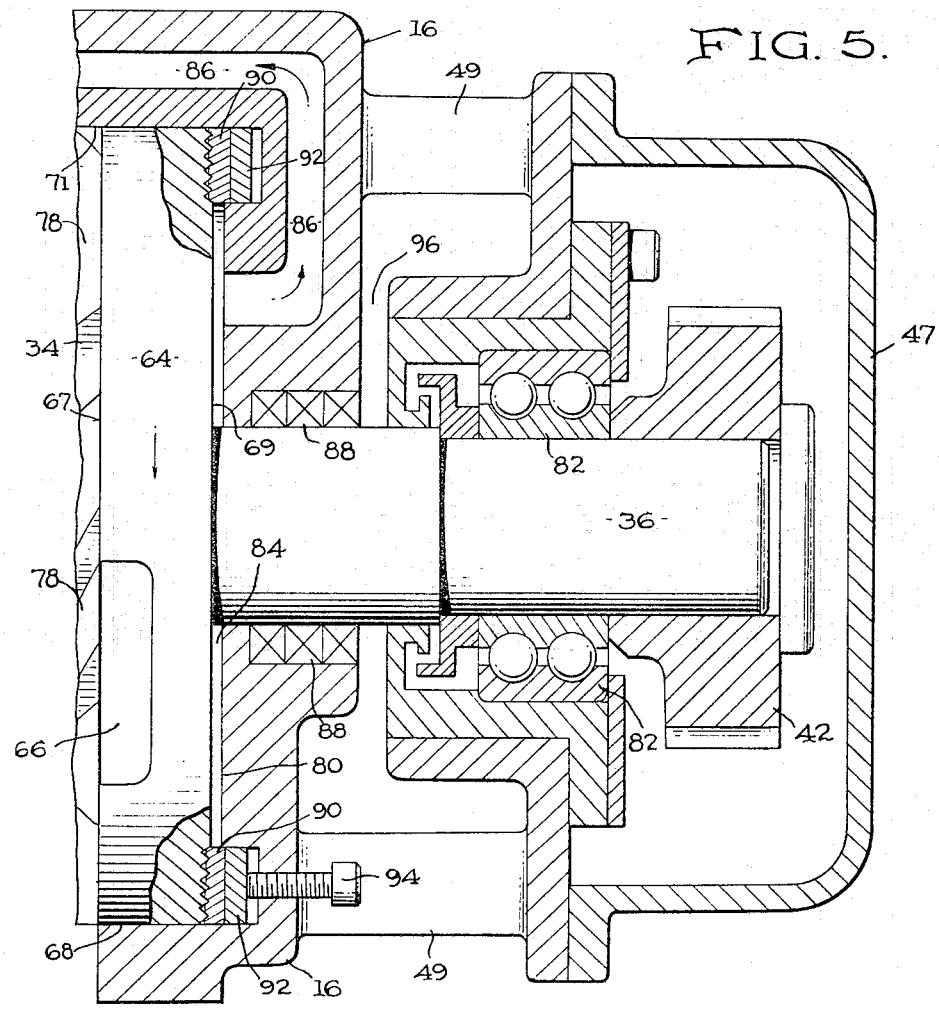
FIG. 5 is an enlarged fragmentary side elevational view, partly in cross section, showing the details of a preferred sealing arrangement for the discharge end of the main rotor.
Figure 6:
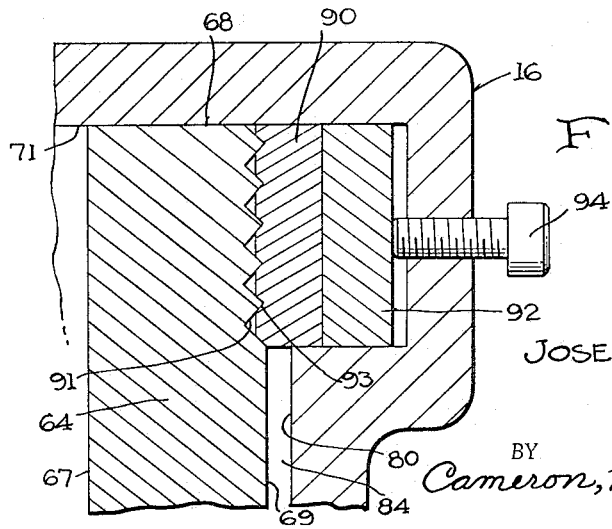
FIG. 6 is a further enlarged, fragmentary sectional view of the self-fitting seal of FIG. 5.

Without the disc 64, the thrust resulting from the pressure of fluid being compressed in the pockets would act against the thread surfaces 78 of the main rotor 34 and the inner face 80 of the end wall 16, and since the rotor threads are rotating and the end wall is stationary, the thrust would be applied to a thrust bearing, such as that shown at 82 in FIG. 5. By fixing the disc 64 to the main rotor, the pressure in the pockets acts against the thread surfaces 78 and the rotating disc 64 so that the thrusts balance one another and thereby eliminate any thrust on bearing 82.

As shown in FIGS. 1, 2, 5 and 6, disc 64 is spaced from the inner face 80 of end wall 16 to provide a clearance space or channel 84 which communicates with the extreme ends of the suction pockets via a by-pass passage 86 formed in the end wall 16 and side wall of housing 10. Leakage past the peripheral sealing surface 68 of disc 64 into space 84 may therefore be exhausted into the passage 86. The location of the exhaust end of passage 86 depends upon the wrap angle of the rotor threads and the amount of internal compression in the discharge pockets, but is substantially correct as shown in FIGS. 2 and 8. Since the air in the suction pockets is never quite up to atmospheric pressure, there is always a slight vacuum in the extreme ends of these pockets remote from the suction port 50, and thus in passage 86 and space 84. The rotor shaft seal 88 therefore operates against a vacuum instead of superatmospheric pressure.

To minimize the amount of back-flow, an annular sealing member 90 may be provided at the outer face 69 of disc 64. In the form illustrated in FIGS. 5 and 6, seal ring 90 is made of a soft metal or other suitable sealing material and is fastened to a backing ring 92. Suitable adjusting means 94 are provided to vary the force with which the seal ring 90 bears against the outer face 69 of disc 64. The disc 64 may have small grooves 91 cut into its surface so that, when the seal ring 90 is forced against the disc, complementary grooves 93 will be worn into the sealing member. The seal is preferably "worn in" at low speed so as to automatically establish a close running clearance, since it is not intended to utilize friction sealing during normal operation of the device.

Since space 84 is maintained at a slight vacuum, there is no loss of volume due to leakage past the seal ring 90 and very little loss of power due to re-expansion. Since shaft seal 88 works against a slight vacuum, any leakage into the clearance space 84 is from the atmosphere through the vent space 96 (FIG. 5). With this vent space, there is no possibility of oil leaking into the rotor chamber, or of any pressure or vacuum build-up in the gear case 47.

As hereinbefore stated, the venting disc can be fixed to either the main rotor or the gate rotor, although it is preferred to mount the disc on the main rotor because it then performs the additional, and even more important, function of eliminating thrust on the main rotor bearing. However, FIGS. 12–15 illustrate another embodiment of the invention wherein a disc 100 provided with venting ports 102 is fixed to the gate rotor 38. Operation of this device is similar to that of the embodiment of FIGS. 1–11 wherein the venting disc is located on the main rotor, but the shape and spacing of the venting ports are modified.

As shown best in FIG. 13, each port 102 is substantially L-shaped, having its inlet in the inner face 103 of the disc at a point spaced radially inward from the peripheral surface 104, and its outlet in said peripheral surface at a point spaced from the edges thereof. As in the case of the previously described embodiment, opening and closing of the venting ports is controlled by the rotational movement of peripheral surface 104 of the disc relative to the partially surrounding surface 105 of the end wall 16 which is cut back between the side edge 106 and the cut-off edge 107 of the discharge port 48', as indicated at 108, in order to provide space through which the trapped air may escape to the discharge port. To counterbalance any thrust developed by the disc 100, wall 16 is also provided with a suitably sized pressure cavity 109 which is maintained in communication with the discharge port through space 108, as shown. In this form of the invention, the leading edge of the inlet of each port 102 is coincident with the trailing edge of a gate rotor thread at the discharge end of the rotor, the leading edge of the outlet is slightly rearward of the trailing crest edge of the same thread, and the trailing edge of the outlet is approximately 20° behind its leading edge.

FIGS. 14 and 15 illustrate the manner in which the sealed pocket 62 is vented when the venting disc is supported on the gate rotor 38, and are comparable to FIGS. 10 and 11 of the first embodiment. As indicated in FIG. 14, the sealed pocket 62 is formed as the rotors roll into full mesh at the discharge end of the compressor. The fluid entrapped in this sealed pocket escapes through port 102 which maintains the pocket in direct communication with the discharge port 48' until the pocket runs out as shown in FIG. 15. At this time, the trailing edge of the port outlet passes beyond the cut-off edge 107 of the discharge port and leakage to the suction side is prevented. As shown in FIGS 12, 14 and 15, the surface 111 of the end wall is level with the inner surface 103 of the disc 100, and the ends of the main rotor threads make a seal therewith. Since the surface 79 of the end wall is lower than the surfaces 103 and 111, the fluid escaping through the ports 102 is discharged directly into the discharge port 48'.

It will be apparent from the foregoing description that there has been provided by the present invention an effective arrangement for venting entrapped fluids in screw type compressors and for simultaneously eliminating unbalanced thrust forces on the rotors. Although two different embodiments of the invention have been described and illustrated, it will be obvious to those skilled in the art that various modifications may be made in the form, details of construction and arrangement of the parts without departing from the inventive concept. It is therefore intended by the appended claims to cover all such modifications which fall within the true scope of the invention.

What is claimed is:

1. In a fluid compressor or similar device of the type having a housing forming intersecting cylindrical rotor chambers, a suction port and a discharge port arranged diagonally opposite each other in the rotor chamber side walls adjacent the end walls of said housing, and a plurality of complementary helically threaded rotors rotatably supported within said rotor chambers and cooperating with each other and the chamber walls to form pockets at the suction end of the rotors for receiving fluid through said suction port, to advance said pockets and the fluid therein axially along the rotors and to discharge the fluid from said pockets through said discharge port as said rotors revolve about the axes thereof, and wherein said pockets become sealed before running out after normal communication between the pockets and the discharge port is cut off, means for venting directly to the discharge port the fluid trapped in said sealed pockets comprising a control disc fixed to one of said rotors at the discharge end thereof having a cylindrical peripheral surface which rotates in sealing relationship with a surrounding surface fixed relative to the end wall of the housing adjacent the discharge port, an opening in said surrounding surface leading to said discharge port, and a plurality of venting passages in said disc opening to the peripheral surface thereof through which the fluid trapped in said sealed pockets may escape to the discharge port when the ends of said passages in the peripheral surface of the disc are in communication with the opening in the surrounding surface.

2. In a fluid compressor or similar device of the type having a housing forming intersecting cylindrical rotor chambers, a suction port and a discharge port arranged diagonally opposite each other in the rotor chamber side walls adjacent the end walls of said housing, and a plurality of complementary helically threaded rotors rotatably supported within said rotor chambers and cooperating with each other and the chamber walls to form pockets at the suction end of the rotors for receiving fluid through said suction port, to advance said pockets and the fluid therein axially along the rotors and to discharge the fluid from said pockets through said discharge port as said rotors revolve about the axes thereof, and wherein said pockets become sealed before running out after normal communication between the pockets and the discharge port is cut off, means for venting directly to the discharge port the fluid trapped in said sealed pockets comprising a control disc fixed to one of said rotors having an inner face abutting the discharge end of the rotor and a cylindrical peripheral surface which rotates in sealing relationship with a surrounding surface fixed relative to the end wall of the housing adjacent the discharge port, said surrounding surface being cut away over a portion of its circumferential extent to provide an opening leading to said discharge port, and a plurality of venting passages leading from the inner face of said disc to the peripheral surface thereof through which the fluid trapped in said sealed pockets may escape to the discharge port when the ends of said passages in the peripheral surface of the disc are in registry with the cutaway portion of the surrounding surface.

3. In a fluid compressor or similar device of the type having a housing forming intersecting cylindrical rotor chambers, a suction port and a discharge port arranged diagonally opposite each other in the rotor chamber side walls adjacent the end walls of said housing, a main rotor and a gate rotor rotatably supported within said rotor chambers, said rotors having complementary helical threads and grooves which cooperate with each other and the chamber walls to form pockets at the suction ends of the rotors for receiving fluid through said suction port, to advance said pockets and the fluid therein axially along the rotors and to discharge the fluid from said pockets through said discharge port as said rotors revolve about the axes thereof, and wherein said pockets become sealed before running out after normal communication between the pockets and the discharge port is cut off, means for venting directly to the discharge port the fluid trapped in said sealed pockets comprising a control disc fixed to said main rotor adjacent the end wall of said housing at the discharge end thereof, said disc having a cylindrical peripheral surface which rotates in sealing relationship with a surrounding surface fixed relative to said housing end wall, said surrounding surface having an opening therein leading to said discharge port, and a plurality of venting passages in said disc leading from the discharge ends of the grooves of said main rotor to the peripheral surface of said disc through which the fluid trapped in said sealed pockets may escape to the discharge port when the ends of said passages in the peripheral surface of the disc are in communication with the opening in the surrounding surface.

4. A fluid compressor or similar device as defined in claim 3 wherein said control disc is spaced from said end wall to form a channel therebetween into which fluid leaking between the peripheral surface of said disc and said surrounding surface may pass, and which includes a by-pass passage in said end wall and the adjacent rotor chamber side wall through which fluid may pass from said channel to the extreme ends of the suction pockets formed by the rotors.

5. A fluid compressor or similar device as defined in claim 3 including an annular sealing member interposed between the outer face of said disc and said end wall.

6. In a fluid compressor or similar device of the type having a housing forming intersecting cylindrical rotor chambers, a suction port and a discharge port arranged diagonally opposite each other in the rotor chamber side walls adjacent the ends walls of said housing, a main rotor and a gate rotor rotatably supported within said rotor chamber, said rotors having complementary helical threads and grooves which cooperate with each other and the chamber walls to form pockets at the suction ends of the rotors for receiving fluid through said suction port, to advance said pockets and the fluid therein axially along the rotors and to discharge the fluid from said pockets through said discharge port as said rotors revolve about the axes thereof, and wherein said pockets become sealed before running out after normal communication between the pockets and the discharge port is cut off, means for venting directly to the discharge port the fluid trapped in said sealed pockets comprising a control disc fixed to said main rotor having an inner face abutting the discharge end of the rotor, a solid plane outer face adjacent the end wall of the housing at the discharge end thereof and a cylindrical peripheral surface which rotates in sealing relationship with a surrounding surface fixed relative to said end wall, said surrounding surface being cut away over a part of its circumferential extent to provide an opening leading to said discharge port, said disc providing venting passages leading from the inner face of said disc to the peripheral surface thereof through which the fluid trapped in said sealed pockets may escape through the discharge port when the ends of said passages formed by the disc are in registry with the cut away portion of the surrounding surface, the outer face of said disc being spaced from said end wall to form a channel therebetween into which fluid leaking between the peripheral surface of said disc and said surrounding surface may pass, and a by-pass passage formed in said wall and the adjacent rotor chamber side wall for maintaining said channel in communication with the extreme ends of the suction pockets formed by said rotors.

7. A fluid compressor or similar device as defined in claim 6 including an annular sealing member interposed between said end wall and the outer face of said disc adjacent the periphery of the latter.

8. A fluid compressor or similar device as defined in claim 6 wherein each of said venting passages is in the form of a recess in the inner face of said disc extending inwardly from the peripheral surface thereof and only partially through the thickness thereof, each of said passages having its trailing edge coincident with the leading edge of a main rotor thread at the discharge end thereof.

9. In a fluid compressor or similar device of the type having a housing forming intersecting cylindrical rotor chambers, a suction port and a discharge port arranged diagonally opposite each other in the rotor chamber side walls adjacent the end walls of said housing, a main rotor and a gate rotor rotatably supported within said rotor chambers, said rotors having complementary helical threads and grooves which cooperate with each other and the chamber walls to form pockets at the suction ends of the rotors for receiving fluid through said suction port, to advance said pockets and the fluid therein axially along the rotors and to discharge the fluid from said pockets through the said discharge port as said rotors revolve about the axes thereof, and wherein said pockets become sealed before running out after normal communication between the pockets and the discharge port is cut off, means for venting directly to the discharge port the fluid trapped in said sealed pockets comprising a control disc fixed to said gate rotor adjacent the end wall of said housing at the discharge end thereof having a cylindrical peripheral surface which rotates in sealing relationship with a surrounding surface fixed relative to said end wall, said surrounding surface having an opening therein leading to said discharge port, and a plurality of venting passages in said disc having outlet openings in the peripheral surface of said disc through which the fluid trapped in said sealed pockets may escape to the discharge port when the outlet openings of said passages are in registry with the opening in the surrounding surface.

10. A fluid compressor or similar device as defined in claim 9 wherein each of said venting passages has an inlet opening in the inner face of said disc at a point spaced radially inward from the peripheral surface thereof, each oulet opening lies in said peripheral surface intermediate the edges thereof, and the leading edge of each inlet opening is coincident with the trailing edge of a gate rotor thread at the discharge end thereof.

11. A fluid compressor or similar device as defined in claim 9 including a pressure cavity between a portion of the outer face of said disc and said end wall, said cavity communicating with said discharge port through the opening in said surrounding surface.

References Cited by the Examiner
UNITED STATES PATENTS

| | | | |
|---|---|---|---|
| 630,648 | 8/1899 | Brewer | 123—12 |
| 1,991,541 | 2/1935 | Cannizzaro | 103—128 |
| 2,266,820 | 12/1941 | Smith | 230—143 |
| 2,287,716 | 6/1942 | Whitfield | 230—143 |
| 2,460,310 | 2/1949 | Rathman | 230—143 |
| 2,486,770 | 11/1949 | Whitfield | 103—128 |
| 2,511,878 | 6/1950 | Rathman | 230—143 |
| 2,578,196 | 12/1951 | Montelius | 123—12 |
| 2,620,968 | 12/1952 | Nilsson | 230—143 |
| 2,656,972 | 10/1953 | Rathman | 230—143 |
| 2,922,377 | 1/1960 | Whitfield | 103—128 |

MARK NEWMAN, *Primary Examiner.*

W. J. GOODLIN, *Assistant Examiner.*